United States Patent [19]
Herdeman et al.

[11] Patent Number: 5,333,394
[45] Date of Patent: Aug. 2, 1994

[54] CONTROLLED ATMOSPHERE CONTAINER SYSTEM FOR PERISHABLE PRODUCTS

[75] Inventors: Robert W. Herdeman, Loveland; Taras A. Kowalczyn, Cincinnati, both of Ohio; Charles R. Graham, Long Beach, Miss.; John Herzstein, Harleysville, Pa.

[73] Assignee: Chiquita Brands, Inc., Cincinnati, Ohio

[21] Appl. No.: 79,357

[22] Filed: Jun. 17, 1993

[51] Int. Cl.⁵ ..................... F26B 3/00; F26B 21/00
[52] U.S. Cl. ..................................... 34/467; 34/218; 34/516; 34/569
[58] Field of Search ............... 34/218, 219, 220, 221, 34/36, 26, 224, 54; 62/48, 62, 78; 426/419, 418; 99/467

[56] References Cited

U.S. PATENT DOCUMENTS

| | | |
|---|---|---|
| 2,079,304 | 5/1937 | Polderman . |
| 2,774,230 | 12/1956 | Kasser . |
| 3,487,769 | 1/1970 | Dixon . |
| 3,958,028 | 5/1976 | Burg . |
| 4,003,728 | 1/1977 | Rath . |
| 4,454,723 | 6/1984 | Weasel, Jr. . |
| 4,474,020 | 10/1984 | Freeman . |
| 4,537,043 | 8/1985 | Volker et al. . |
| 4,566,282 | 1/1986 | Knoblauch et al. . |
| 4,716,739 | 1/1988 | Harris et al. . |
| 4,764,389 | 8/1988 | LaBarge . |
| 4,779,524 | 10/1988 | Wade . |
| 4,817,391 | 4/1989 | Roe et al. . |
| 4,824,685 | 4/1989 | Bianco . |
| 4,833,892 | 5/1989 | Wassibauer et al. . |
| 4,845,958 | 7/1989 | Senda et al. . |
| 4,961,322 | 10/1990 | Oguma et al. . |
| 4,987,745 | 1/1991 | Harris . |
| 5,041,298 | 8/1991 | Wallace et al. . |
| 5,054,291 | 10/1991 | Davis et al. . |
| 5,063,753 | 11/1991 | Woodruff . |
| 5,071,667 | 12/1991 | Grune et al. . |
| 5,120,329 | 6/1992 | Sauer et al. . |
| 5,152,966 | 10/1992 | Roe et al. . |
| 5,172,558 | 12/1992 | Wassibauer et al. . |

*Primary Examiner*—Henry A. Bennett
*Attorney, Agent, or Firm*—Frost & Jacobs

[57] ABSTRACT

A controlled atmosphere container system for shipping and storing perishable products, wherein the container system includes a plurality of individual, transportable containers to be connected from time to time with a central source for providing a controlled atmosphere to those containers. A controller preferably enables the container system to optimally allocate the capacity of the central source of the controlled atmosphere based upon the relative atmospheric conditions of the containers attached thereto and the capacity of the source. Such control is provided in the form of a predetermined hierarchy of priorities for allocating the controlled atmosphere gas to the individual containers. The containers themselves each preferably include an automatic relief valve and at least one check valve drain member having a flexible sleeve which can be connected adjacent a drain hole in the floor of the storage volume, and a check valve insert which can be placed within the sleeve and removed from the exterior of the housing. In a preferred arrangement, the central source for the controlled atmosphere gas includes at least one distribution control unit which acts to selectively direct controlled atmosphere gas to individual containers in accordance with the allocation hierarchy of the system. The resulting system is quite flexible and adaptive such that a varying number of containers can be connected to the system, and the controller proceeds in accordance with the hierarchy of priorities to allocate the controlled atmosphere gas to particular containers based upon priority needs and the overall capacity of the system.

21 Claims, 6 Drawing Sheets

CONTROLLED ATMOSPHERE CONTAINER SYSTEM FOR PERISHABLE PRODUCTS

TECHNICAL FIELD

This invention relates to an improved controlled atmosphere container and shipping system for perishable products such as fruit, vegetables and the like, and more particularly, to a combination of a plurality of substantially gas tight controlled atmosphere modular containers which are interchangeably connectable to a central source for providing a controlled atmosphere, wherein the system automatically adapts to optimally provide controlled atmosphere to a plurality of connected containers in accordance with a predetermined hierarchy of control mode priorities based upon the relative atmospheric conditions within the connected containers. The system enables optimal control of the controlled atmospheres within a varying number of connected containers. The containers may have widely differing relative internal atmospheric conditions when initially connected to the system, and the system prioritizes provision of controlled atmosphere supply to all of the connected containers in accordance with the preprogrammed hierarchy and the capacity of the system.

BACKGROUND ART

It is quite common for storing and shipping of perishable products such as fruits, vegetables and the like, to provide refrigeration and/or controlled atmospheres to maintain the freshness of the perishable goods. Particularly, because many perishable goods such as tropical fruits and the like must be shipped relatively long distances to remote markets, it is difficult to maintain the freshness of these goods after harvest during the sometimes extended time periods required for shipping, importation, and distribution. Moreover, for most of these products, it is desired to avoid freezing the products, which can cause extensive damage and deterioration to the quality and desirability of the product.

It is also well known that certain perishable products such as fruits or vegetables can be maintained in fresher condition at above-freezing refrigerated temperatures, especially when maintained in an atmosphere which is less conducive to rapid ripening and spoilage. For example, U.S. Pat. No. 4,716,739, which issued to S. Harris et al., describes a system wherein a container loaded with perishable products is initially flushed with a nitrogen gas to reduce the oxygen level to a base initial level, and thereafter oxygen levels are controlled by selective inflow of ambient air. The carbon dioxide levels ($CO_2$) are maintained below a predetermined maximum by the use of a $CO_2$ scrubber device. In the Harris system, however, the seal of the container is critical, as it must be leak tight to a sufficient degree to control the inflow of oxygen, but cannot be completely air-tight, as inflowing ambient air is relied upon to provide a certain minimum oxygen level.

It is also known that fruit and other perishable items continue what is known as "respiration", utilizing oxygen and giving off $CO_2$, after harvesting. The rate of respiration can fluctuate widely, and is affected greatly by temperatures and oxygen levels in the atmosphere around the products. The Harris patent also refers to previous patents, such as U.S. Pat. No. 3,239,360, which presumably teach the requirement of periodically purging the atmosphere with nitrogen gas based upon controls within the container which respond to oxygen levels within the shipping container itself. Such arrangements, however, were based solely on the oxygen level within the container and required containers designed to allow leakage of gas. These systems also would require relatively large amount of nitrogen for long shipping distances.

A similar prior technology is discussed in the Harris patent, and referred to as the "TECTROL" System associated with the Transfresh Corporation. The container in this system would be sealed prior to shipping and prior to being precharged with a controlled atmosphere gas. During shipping, the oxygen and carbon dioxide levels within the container were to be controlled merely by a bleed hole which enabled the inflow of ambient oxygen, and the inclusion of hydrated lime within the container to absorb excessive amounts of carbon dioxide. In such a situation, it is virtually impossible to adequately maintain the atmospheric conditions within the container throughout the shipping and storage procedures.

Another fresh food storing device is set forth in U.S. Pat. No. 4,961,322, and includes both a cooling mechanism and a supply of nitrogen. Oxygen levels within this device are to be controlled by the input of nitrogen and/or the use of a lighting lamp therewithin to encourage photosynthesis. Yoguma et al. patent also contemplates the use of a two-way pressure regulating means and a safety valve to ensure that pressure within the container does not exceed a predetermined level, and a discharge hole of the pressure regulating means which is to enable the drainage of water collected in the bottom of the storing volume. This device, however, is not practical for shipping large quantities of perishable goods over long distances.

Other prior art references, such as U.S. Pat. No. 4,454,723 (which issued to G. Weasel) also recognized the desirability of providing controlled atmoshere to refrigerated produce transport devices. Particularly, the Weasel reference sets forth a desirable oxygen level of between about 1 and 5%. Similarly, U.S. Pat. No. 5,172,558 (which issued to R. Wassibauer et al.) suggests the control of oxygen, carbon dioxide, ethylene and argon gases within the storage volume of a refrigerated container by the use of initial nitrogen flushing, and, thereafter, the addition of ambient air to ensure minimal levels of oxygen, and the addition of other gases provided in the form of special containers with the device as needed. Other systems, such as may be found in cargo ships or the like, may include a nitrogen generator which provides inert gas to large cargo hold areas in which produce containers are maintained for shipping. Such arrangements, however, do not provide controlled atmosphere to individual containers, and rely on bulk handling of the potentially widely varying conditions within such containers.

As with many of the other prior devices and procedures heretofore available, this art suggests arrangements and assemblies which require relatively substantial structures and support equipment. Heretofore, there has not been available a single integral yet flexible controlled atmosphere container system which can reliably provide optimal provision of controlled atmospheric conditions within a plurality of individual and transportable containers for perishable products in a substantially uniform and predictable manner.

DISCLOSURE OF THE INVENTION

It is an object of this invention to address the above-described problems and shortcomings of the storage and shipping containers for perishable products which have been available in the industry up to this time.

It is another object of the present invention to provide an improved controlled atmosphere container system for perishable products which incorporates a central source of controlled atmospheric gas for a plurality of individual, transportable connected controlled atmospheric containers.

It is yet another object of the present invention to provide a controlled atmosphere container system which enables the selective connection of one or more modular containers to a centralized source of controlled atmospheric gas, and wherein the system is controlled so as to provide the controlled atmosphere to each of the connected containers in a relatively uniform and predictable manner in accordance with a hierarchy of priorities based upon the relative atmospheric conditions of the connected containers.

It is also an object of the present invention to provide a controlled atmosphere container system which enables the connection of a number of groups of containers for perishable products, and wherein the system can automatically adapt to the varying number of containers attached thereto and varying atmospheric conditions within the attached containers to optimally distribute controlled atmosphere gas to all containers on a predetermined hierarchy basis of priority according to the capacity of the controlled atmospheres gas source.

It is yet another object of the present invention to provide an improved controlled atmosphere container for use with the subject container system which is relatively modular in form and includes a controlled atmosphere gas input port for detachably connecting the container to a central supply source, and an automatic relief valve to ensure that pressure within the container does not exceed a predetermined maximum value.

It is also an object of the present invention to provide an improved method for the storage and shipping of perishable products in the controlled atmosphere containers and container system set forth herein in order to optimally provide controlled atmospheres to a plurality of individual, transportable containers from a central source having a predetermined capacity and in accordance with a hierarchy of priorities based upon the relative atmospheric conditions within attached containers.

In accordance with one aspect of the present invention, there is provided a controlled atmosphere container system for shipping and storing perishable products, wherein the container system includes a plurality of modular containers to be connected from time to time with a central source for providing a controlled atmosphere to attached containers. The container system preferably includes a controller which enables the container system to optimally allocate the capacity of the central source of the controlled atmosphere based upon the relative atmospheric conditions of the containers attached thereto and the capacity of the source. Such control is preferably provided with a predetermined hierarchy of priorities for allocating the controlled atmosphere gas to the individual containers. The containers themselves each preferably include a housing defining an internal storage volume for perishable products which is substantially air tight and at least one door member which can be opened for loading/unloading procedures, and, thereafter, sealed for storage and shipping procedures.

An automatic relief valve is preferably provided and includes a one-way valve member with a predetermined effective mass which is oriented such that gravity normally helps maintain the relief valve in closed position. The valve member is designed to be displaced in order to vent the atmosphere within the storage volume when pressure therewithin reaches a predetermined maximum. The container also preferably includes at least one check valve drain member having a flexible tubular sleeve which can be connected adjacent a drain hole in the floor of the storage volume, and a substantially tubular check valve insert which can be placed within the sleeve and removed from the exterior of the housing.

In a preferred arrangement, the central source for the controlled atmosphere gas includes a plurality of distribution control units which act as manifolds for directing controlled atmosphere gas to individual containers in accordance with the allocation hierarchy of the system. The system is thereby quite flexible and adaptive such that a varying number of containers having different internal atmospheric conditions can be connected to the system, and the controller proceeds in accordance with the hierarchy of priorities to allocate the controlled atmosphere gas to particular containers based upon priority needs and the overall capacity of the system.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
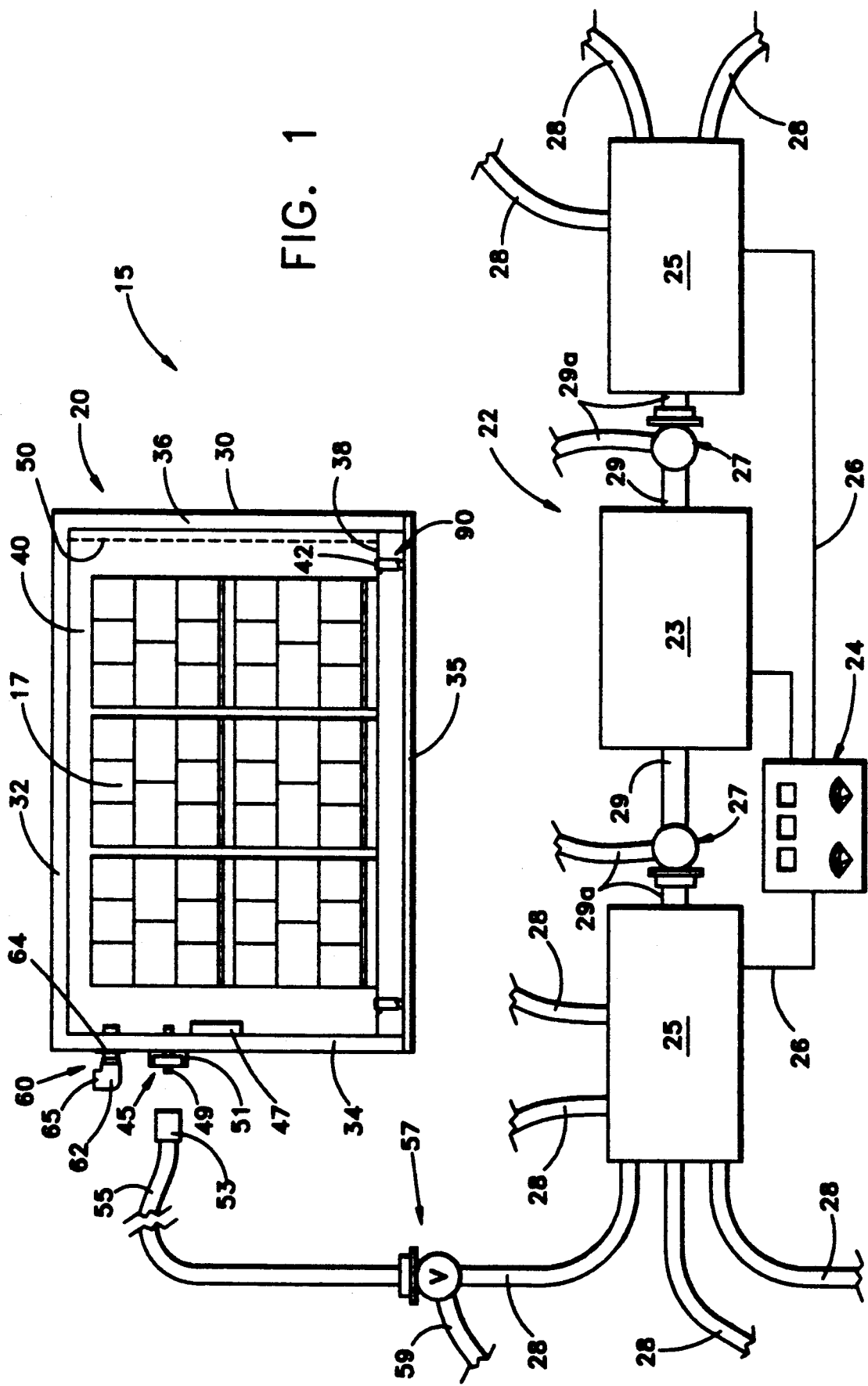
FIG. 1 is a partial schematic illustration of a controlled atmosphere container system made in accordance with the present invention.

Referring now to the drawings in detail, wherein like numerals indicate the same elements throughout the views, FIG. 1 shows, in schematic form, a preferred arrangement of a controlled atmosphere container system 15 made in accordance with the present invention. Particularly, container system 15 is shown as including one or more modular individual container for receiving and storing perishable products (e.g., product filled boxes 17) shown within a storage volume 40 therewithin. Container 20 comprises a housing or frame 30 having a series of interconnected and spaced top (32), side (34) and bottom (35) walls, and reciprocable door arrangement or member 36.

A storage volume 40 is defined by the top and side walls 32 and 34, door member 36, and the interior floor member 38. As will be understood, it is preferred that storage volume 40 be provided as a substantially air-tight space. To prevent substantial leakage into storage volume 40, it is preferred that the connections between the adjacent walls of housing 30 and floor member 38 be carefully connected and sealed such as by welding, brazing, caulking, and/or with other gaskets and/or sealing arrangements. Cargo structures similar to the modular container 20 illustrated can be obtained from varying sources in the industry (such as from Nippon Freuhauf of Atsugi, Japan) and can be provided with additional leak-tight features as necessary.

It may also be preferred to incorporate a sealing curtain (e.g., 50) mounted adjacent the inside of door 36 to reduce leakage therethrough. Such sealing curtains are often used in controlled atmosphere storage devices, and are well known in the industry. It will also be understood that a certain minimal leakage of ambient air into container 20 will be expected, and will be preferred in most cases, to allow a minimum in-flow of oxygen in use. In substantially air-tight arrangements, it may even be important to design into the system a predetermined amount of leakage, such as by an adjustable vent or the like, to facilitate uniform and reliable in-flow of oxygen and out-flow of $CO_2$, and to prevent anaerobic conditions in fruit containers.

Side or end wall 34 is also illustrated as being fitted with a quick connect/disconnect controlled atmosphere gas input port 45 which will detachably and selectively provide fluid connection between storage volume 40 and a source (e.g., 22) of the controlled atmosphere, which will most preferably be provided in the form of a gas. Input port 45 is illustrated as including a male connection 49 fitted through the bulkhead of side wall 34, preferably with a security cover/connection adapter 51 mounted adjacent the exterior portion of side wall 34. A flexible hose supply line 55 is illustrated as including a female quick connect coupler 53 at its distal end for detachable and selective connection with container 20. Obviously, the male/female order described could equally be reversed if desired. As will be understood, when container 20 is connected to a central source of controlled atmosphere gas (e.g., 22), input port 45 will be appropriately connected to a respective supply line (e.g., 55).

Container 20 is also illustrated as optionally including an internally mounted atmospheric monitoring means, which can also include a wiring harness or similar detachable connection which can be selectively attached to one or more distribution control unit (e.g., 25) and/or the controller (e.g., 24) of a central controlled atmosphere source (e.g., 22) of the present invention, as will be described in more detail below. Such monitoring means can include various sensors for constituents of the controlled atmosphere within container 20, such as oxygen, carbon dioxide, ethylene, and the like. In some applications of the present invention, the means for monitoring the atmospheric condition within storage volume 40 may also comprise temperature and pressure sensors, and/or a signalling device to indicate to the controller of the controlled atmosphere source, information such as the time of connection/disconnection of a particular container.

In a more sophisticated embodiment of the present invention, it may be preferred that the relative atmospheric conditions of the individual containers connected to the central station be determined for implementation of the hierarchal priority system of the present invention. While the use of accurate sensors may be available in some arrangements, more simplified means of generally determining the relative atmospheric conditions may be preferred, such as time of connection monitoring arrangements or the like. For example, a mobile or hand-held atmospheric measuring device might be selectively attached to a sampling port or an auxiliary branch (not shown) of the input port 45 arrangement, a built-in sensing apparatus with an external display device for selective or constant monitoring might be included, or means for automatically drawing samples of the internal atmosphere for remote testing could alternatively be employed depending on the level of sophistication and automation desired.

Figure 3:
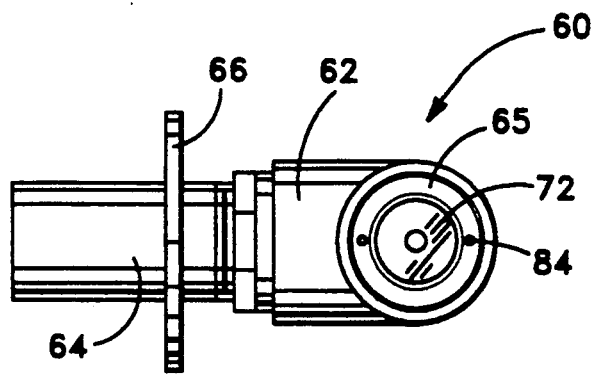
FIG. 3 is a top plan view of the automatic relief valve of FIG. 2.
Figure 2:
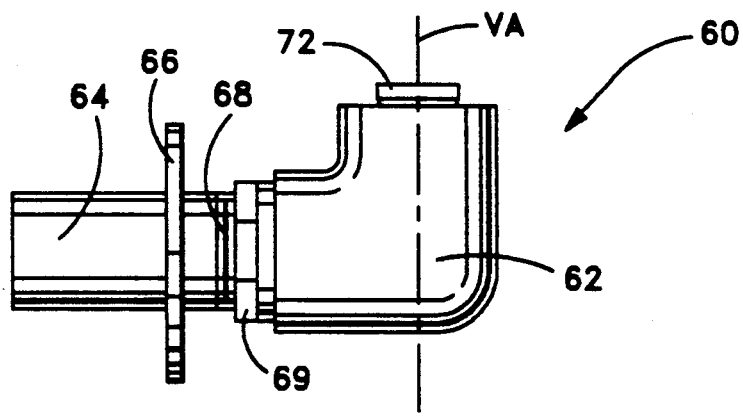
FIG. 2 is an elevational view of a preferred automatic relief valve arrangement of the container of the present invention as illustrated in FIG. 1.
Figure 4:
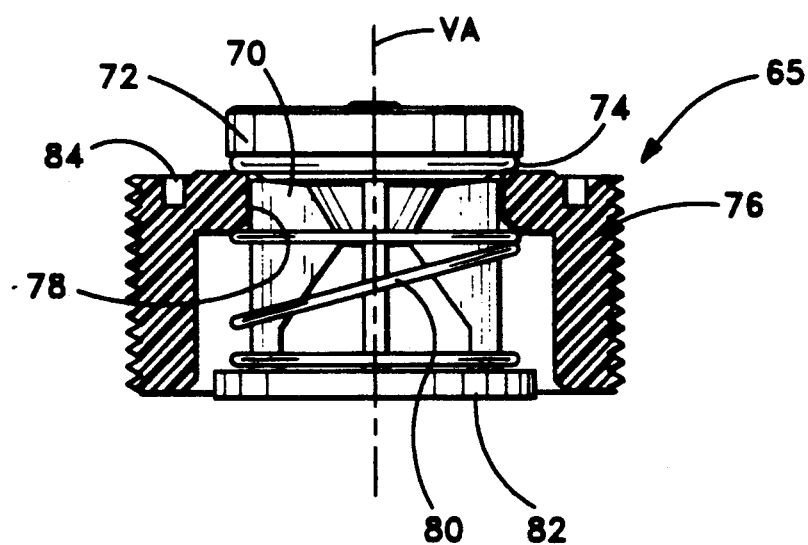
FIG. 4 is an enlarged cross-sectional view of a preferred one-way valve member assembly for the relief valve arrangement of FIGS. 2 and 3.
Figure 6:
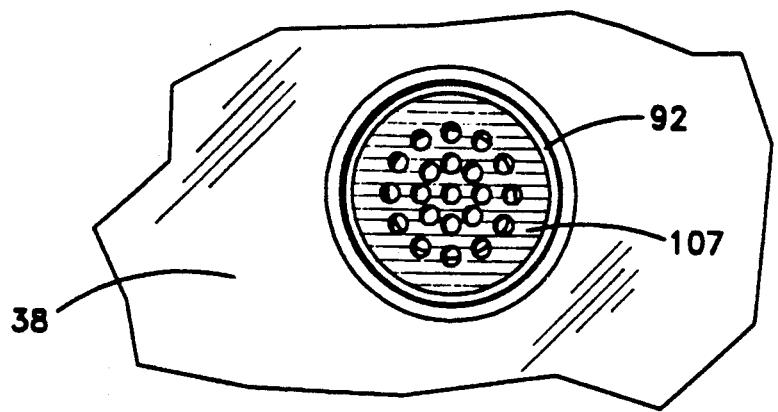
FIG. 6 is a partial top plan view of the drain assembly of FIG. 5.

As also illustrated in FIG. 1, a preferred container 20 will also include an automatic relief valve 60 for providing venting between storage volume 40 and the ambient atmosphere. As best seen in FIGS. 2-4, a preferred automatic relief valve 60 comprises an L-shaped conduit or pipe 62 attached to the outer distal end of a threaded nipple or pipe 64 welded or otherwise attached through the bulkhead of side wall 34. As illustrated, pipe 62 might preferably comprise a plastic pipe or the like having a connector 67 which can be threadedly secured onto the distal end 68 of pipe 64. A pressure relief valve 65 is located within the upper open end of pipe 62, and is illustrated with an externally threaded valve body 76 having a vent opening 78 and an upper valve seat 74 within which is located reciprocable valve member 70.

Valve member 70 preferably comprises a predetermined mass specifically designed such that when oriented in a substantially vertical manner, the mass of valve member 70 will help resist upward movement until pressure within storage volume 40 of the container reaches a predetermined maximum (or cracking) pressure. Until that predetermined pressure is reached, the seat flange 72 of valve member 70 will remain in sealing contact upon valve seat 74 to maintain relief valve 60 in closed condition. A biasing member such as spring 80 is also preferred to insure that venting resistance is uniformly maintained and to facilitate the return of valve member 70 to its closed condition as quickly as possible following a venting procedure. Once the excess pressure within storage volume 40 is relieved, it is imperative that the valve close securely and immediately to prevent unwanted inflow of ambient air, which could adversely affect the controlled atmosphere within the container.

Relief valve 65 is further shown as including a lower retainer lug 82 on valve member 70 to ultimately limit the longitudinal movement thereof during venting procedures, thereby limiting the maximum venting flow rate as well. The relative sizes of the individual members of relief valve 60, as well as the orientation of and weight or mass of valve member 70 and the free length and tension of biasing spring 80 can be adjusted to provide a valve arrangement having an effective mass to accommodate critical flow rates needed for venting and to protect the gas-tight integrity of container 20, while maintaining the controlled atmosphere therewithin. The procedures and equations for determining the valve coefficient, flow rates, and the like are known to those skilled in the valving industry and will not be included herein accordingly. As seen best in FIG. 4, one or more tool recesses 84 may also be provided in valve body 76 to facilitate the insertion and/or removal of relief valve 65 from its adapter (e.g., pipe 62). Similarly, pipe 64 is shown as including an attachment flange 66 to facilitate welding or other attachment to the bulkhead of container 20.

As mentioned above, and as shown in FIGS. 1, 2, and 4, because gravity is a factor relied upon to act on the mass of valve member 70 in order to help maintain relief valve 65 in its normally closed condition, it is important that relief valve 65 be oriented in a substantially vertical condition. While absolute vertical orientation is not critical, it is important that valve member 70 be aligned for longitudinal reciprocation along an axis (VA) which is substantially perpendicular to the ground in normal storage or shipping conditions of container 20. By utilizing the gravitational forces in this way, relief valve assembly 60 is less dependent upon relative pressure differentials and the possibly changing biasing characteristics of spring 80, and more precise control of the absolute pressure within container 20 is provided in use.

As best illustrated in FIGS. 1 and 5-7, container 20 also preferably includes one or more check valve drain assemblies (e.g., 90) located adjacent floor 38 to enable fluids such as condensation and the like to be drained from storage volume 40. Particularly, with respect to products such as fruits and vegetables, which often produce condensation as a result of continued respiration, it is important to provide a means for releasing collected fluid from within volume 40 to protect the protect the product and to maintain optimal atmospheric conditions therewithin. Shipping containers commonly available in the industry generally include one or more drain holes, often having a downwardly extending drain pipe (e.g., 92) attached such as by welding or threading through the floor member 38. While check valves have been known for use with drain pipes and the like, a common problem has been in properly fitting check valve assemblies into drain pipes of varying dimensions for the variety of shipping containers heretofore available. It is also difficult and inconvenient to maintain check valve assemblies in operable condition when they must be inserted and accessed from within the container. Check valve assembly 90 made in accordance herewith, however, overcomes these objections by enabling the connection and maintenance of the check drain valve from the exterior of container 20.

Figure 5:
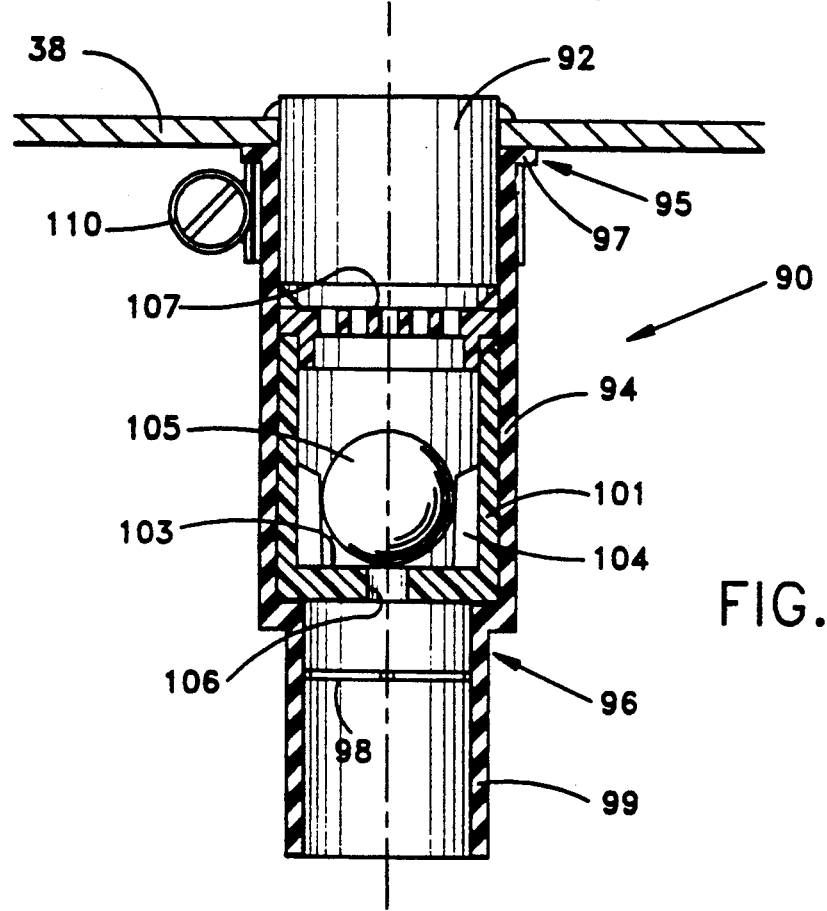
FIG. 5 is an enlarged cross-sectional view of a preferred check valve drain assembly as illustrated in FIG. 1.
Figure 7:
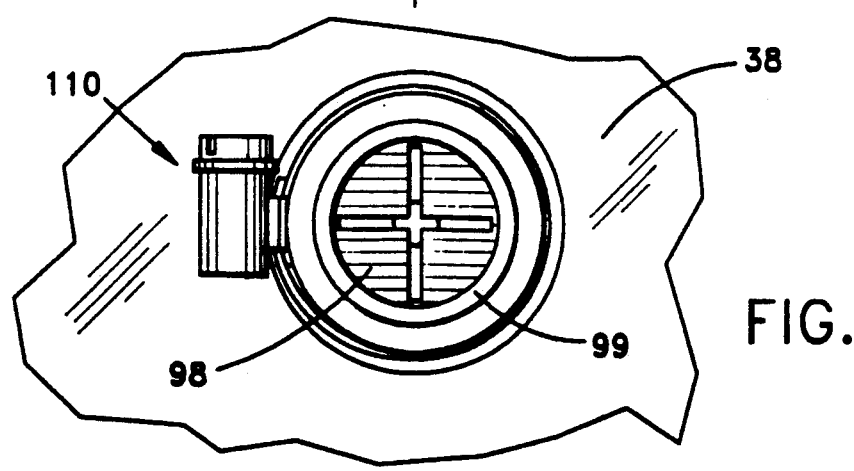
FIG. 7 is a bottom plan view of the drain assembly of FIG. 5.

As best seen in FIG. 5, check valve assembly 90 preferably comprises a substantially tubular, flexible sleeve 94 having a top portion 95 and a bottom portion 96. A flange 97 may be provided adjacent top portion 95 to further facilitate attachment procedures. Particularly, it is contemplated that flexible sleeve 94 will be slidably telescoped over the downwardly depending portion of drain pipe 92 below floor member 38. As seen in FIG. 1, floor 38 is often recessed within housing 30, and above bottom wall 35 thereof. Access to the lower portion of drain pipe 92 from the exterior of container 20 is substantially available at all times, thereby facilitating the attachment to and maintenance of check valve assembly 90 from outside container 20. A constricting type attachment ring 110 is illustrated as a convenient mode of detachably securing sleeve 94 to drain pipe 92.

Concentrically fitted within flexible sleeve 94 is a removable, substantially hollow tubular insert 101 having a valve seat 103, a drain opening 106, several guide ribs 104, and a ball valve 105 therewithin. Ribs 104 are preferably provided to space ball valve 105 inwardly from the inner surfaces of insert 101, and to help guide ball valve 105 therewithin in use. Optionally, insert 101 may also include a perforated cover 107 to prevent dirt or other extraneous material from interfering with proper operation of the ball valve arrangement. As will also be appreciated, the bottom portion of flexible sleeve 94 can also be provided with an apertured, flexible membrane 98 therewithin. While membrane 98 is optional, it is preferred to provide additional protection of the one-way drain valve insert from ambient conditions such as dirt, wind, rain, ice, and the like. The flexible, apertured nature of membrane 98 enables insertion and removal of the insert 101 as needed, while providing a protective buffer from the surrounding environment.

It may also be preferred to provide bottom portion 96 of assembly 90 with an extended flexible "kazoo" member to further isolate insert 101 from potentially adverse conditions. The flexible extension 99 can also help prevent the buildup of ice or grime as a result of its flexible nature, thereby helping to maintain check valve assembly 90 in operable condition at all times. While sleeve 94 and insert 101 have been illustrated as substantially cylindrical structures, such is not critical and can be modified as desired.

Returning to the illustration of FIG. 1, central source 22 of controlled atmosphere gas preferably comprises one or more gas generators or sources 23 (e.g., a membrane type nitrogen generator or the like) for providing the controlled atmosphere gases as needed to connected containers. Central source 22 will, of course, have a predetermined gas output capacity. A controller (e.g., 24) is most preferably provided to interact with the controlled atmosphere gas source(s) 23 and one or more distribution control units or manifolds 25. As known in the industry, controlled atmosphere source 23 may preferably include devices for extracting oxygen from ambient air to increase the relative percentage of other constituents such as nitrogen. Membrane type devices are available in the industry in a variety of forms, and generally compress the ambient air and pass it through a special membrane which is permeable to oxygen but less permeable to nitrogen and/or other gases which are to be collected. The oxygen rich permeate is vented to the ambient, while the nitrogen rich remaining gases are collected for distribution as the controlled atmosphere for containers attached to the system. It will be understood that source 23 could alternately comprise, for example, a tank of liquid nitrogen, or incorporate pressure swing absorption/molecular sieve technology.

Distribution control unit 25 preferably comprises a manifold for selectively directing controlled atmosphere gas from gas generator 23 and gas buffer or supply lines 29, through pressure regulator valve 27 and supply lines 29a, to individual containers 20 attached to that particular control unit 25. As illustrated, a number of supply lines 29a can radiate from the regulator valve 27, thereby ensuring uniform supply pressure throughout the system. Each distribution control unit 25 also includes a manifold system diverting the controlled atmosphere gas from supply line 29 to the individual distribution lines 28, which, in turn are selectively attached to an individual controlled atmosphere container 20, as seen in FIG. 1. Distribution control unit 25 may be used by itself (i.e., without other control units 25 and controller 24) to control the distribution of atmosphere to a plurality of containers, which may be divided into a plurality of distinct zones. Distribution lines 28 may be relatively rigid and/or permanently installed and arranged in a storage or shipping yard, or in the cargo hold of an airplane, ship, or other transportation vehicle. Individual valving/shut off assemblies (e.g., 57) are also preferably provided for each distribution line 28 for additional automatic and/or manual control of the controlled atmosphere gas.

In a preferred arrangement, a controller 24 may be connected with each distribution control unit 25, such as by interactive data lines 26, for precisely monitoring the distribution and allocation of controlled atmosphere gases from central source 22 to containers attached thereto. It is contemplated that controller 24 may a comprise an interactive control console such as a keyboard or other input device to allow instructions to be entered either in the form of manual signals and/or preprogrammed control instructions. In this regard, a controller board, computer controller, or similar device will preferably be provided as part of controller 24, into which operational instructions can be entered.

In any particular storage or transportation facility, it is contemplated that one or more zones (e.g., zones I, II, etc. illustrated in FIG. 9) will be designated into which a plurality of containers 20 will be placed for connection to a central source 22 of controlled atmosphere gas will be provided, with each such zone having at least one distribution control unit 25 associated therewith. For example, the schematic illustration of FIG. 1 shows portions of a container system 15 having at least one zone with a pair of distribution control units 25 associated therewith. Generally, there will be only a single distribution control unit 25 for each zone of a facility.

It is contemplated that each distribution control unit 25 would have a predetermined number (e.g., 25–30) of hook-ups or distribution lines 28 associated therewith. While generally all of the hook-ups would be utilized to maximize capacity, as mentioned above, unused hook-ups can be closed off via the individual shutoff valve 57 as needed, either manually and/or automatically depending on the application. It is also contemplated that interactive feedback between a distribution control unit 25 and connected containers of the system may be desired to monitor the exact number of containers connected to any particular distribution control unit 25 at any given time, and/or to monitor the relative internal atmospheric conditions of such containers. One advantage of the present system is its adaptability to ensure optimal distribution of the controlled atmosphere gases within the capacity of central source 22 at all times. Where a number of control units 25 are connected to a single central source, it is also preferred to provide a controller 24 or other device which enables interactive communication between the control units 25 to ensure most optimal use of the capacity of a central source (e.g., 22).

It is further contemplated that one or more predetermined subroutines or gas charging control modes will be preprogrammed into container system 15 and associated with one or more distribution control unit 25. The control program can be provided as part of control unit 25, and, in more sophisticated arrangements, may be resident in controller 24 which can act as a supervisor of a plurality of distribution control units 25. Because containers having differing internal atmosphere conditions will require different amounts of controlled atmosphere (CA) gases for optimal storage and shipping conditions, the system is designed to accommodate, and adapt to, these changing and variable needs to optimize the provision of CA gas to all containers connected to the system. In order to achieve a practical system for controlling the amount and flow rate of CA gas supplied to each particular zone and/or to individual containers based upon the relative internal temperature and atmospheric state of those containers, the subroutines of the present invention are broken down into a plurality of predefined operating or control modes. Particularly, these control modes preferably comprise a pull down high priority mode (PHP), a pull down low priority mode (PLP), a quick cycle high priority mode (QCHP), a quick cycle low priority mode (QCLP), and a maintenance mode. A preferred control and priority scheme for implementing these modes is illustrated in the flow diagram of FIGS. 8A and 8B, as will be described.

In one preferred arrangement, these particular modes are each associated with a predetermined flow rate and quantity of CA gas to be provided to each individual container in that mode for a particular product (e.g., bananas). For example, pull down modes are intended to respond to containers which are "fresh cut" or which have previously received little or no controlled atmosphere gas. A pull down mode may also be appropriate for containers which had previously been stabilized in an optimum controlled atmosphere condition, but which have been disconnected from the source of controlled atmosphere gas for an extended period of time. Containers which, based upon their internal atmospheric conditions and temperature, require pull down mode quantities of CA gas, will be provided with a predetermined volume of CA gas mixture as part of an initial control program (e.g., 2500 Standard Cubic Feet (SCF) per container). The specific volume and flow rate of controlled atmosphere gas will, of course, depend upon, among other variables, the gas mixture, the specifics of the perishable products within the container, leak rate of the container itself, and the container volume. The modes can be manually implemented through the distribution control unit 25 or a controller 24, or might be automatically initiated by the program, depending on the application and sophistication of the system.

Figure 8A:
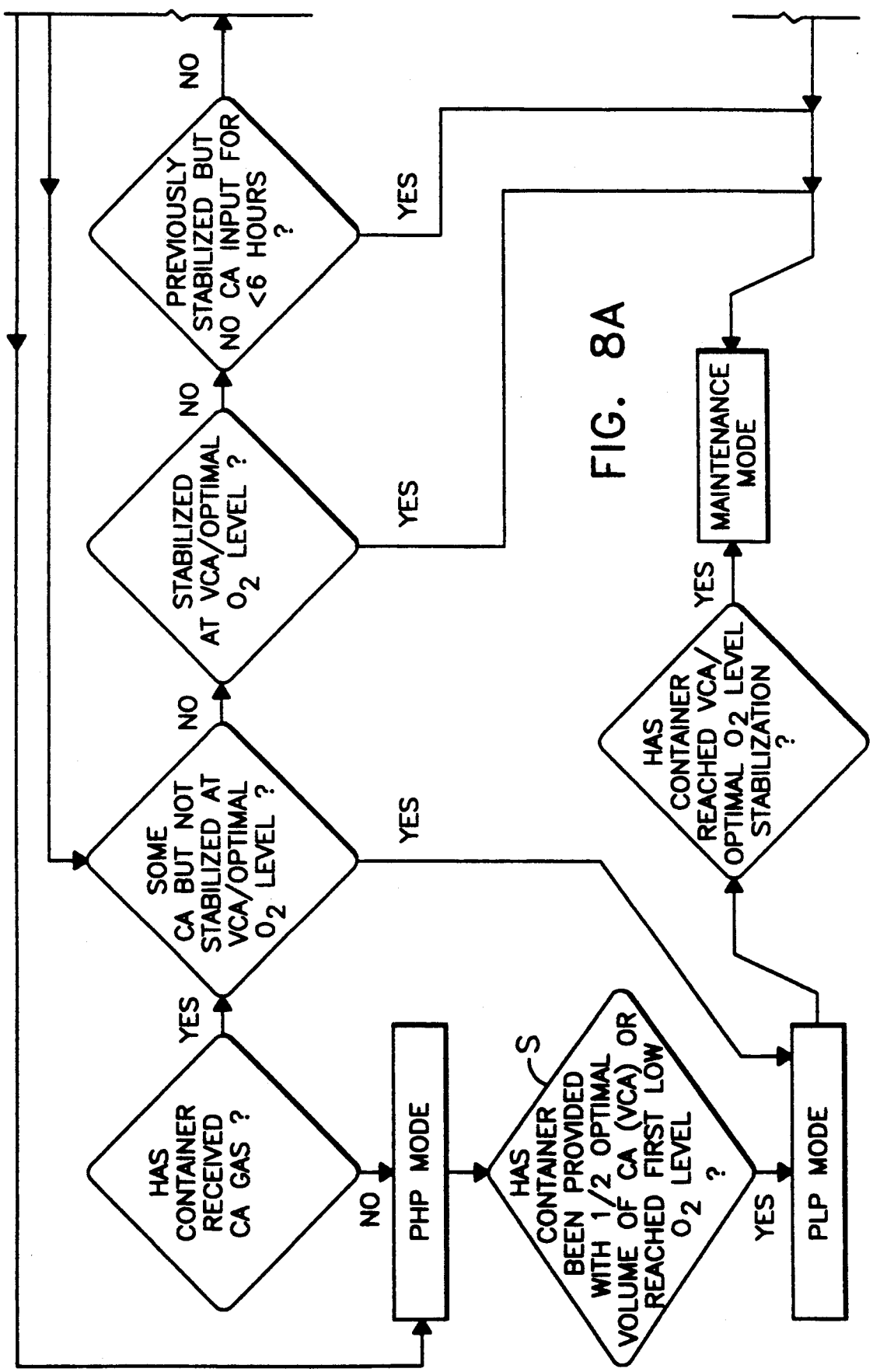
FIGS. 8A and 8B illustrate a schematic flow diagram of a preferred control mode hierarchy of the controller of the present invention.

Under a preferred program of the present invention, the logic of the system can be followed starting at decision block S of FIG. 8A. Once a container has received one half of its total allotment of CA gas in the PHP control mode, the status for that container will automatically be downgraded to the PLP mode. This downgrade helps to liberate capacity for servicing other containers and/or zones of the system. Once the container has received its entire complement of CA gas for the pull down mode and has been stabilized at the optimal controlled atmosphere level (e.g., at the optimal $O_2$ level of about 2–10%), the PLP mode will be downgraded to maintenance mode. In the maintenance mode, the containers receive short bursts of CA gas as needed (e.g. in the simplest application, at predetermined time intervals). For example, once the container has been stabilized at its optimum controlled atmosphere, maintenance of that atmosphere can be achieved by periodic short bursts of CA gas sufficient to replace small amounts of oxygen utilized in respiration and/or nitrogen lost to leakage and the like. The volume and frequency of such bursts (e.g., 30 SCF per hour) can be preprogrammed based upon the particular application.

The quick cycle mode is intended for product containers which have previously been treated with controlled atmosphere gas to the point of stabilization at optimal levels, but which have not been maintained by additional CA gas input. During periods in which controlled atmosphere is not being added to a container, leakage of air into the containers through door seals and the like, as well as product respiration, will change the oxygen percentage of the atmosphere within volume 40. It is generally preferred to maintain the oxygen level for fruits such as bananas at between about 2% and 8%. If a container is treated with CA gas and stabilized at a shoreside terminal yard or on board a transportation vehicle (such as a ship, train, plane or the like), it is often required to disconnect the container for movement between the ship and loading dock or vice versa. Some loading/transportation facilities do not have sufficient capacity central sources and/or controlled atmosphere gas hook ups available immediately, and the containers will remain disconnected and/or with insufficient atmosphere supply for a period of time, often ranging between several hours and several days.

Figure 8B:
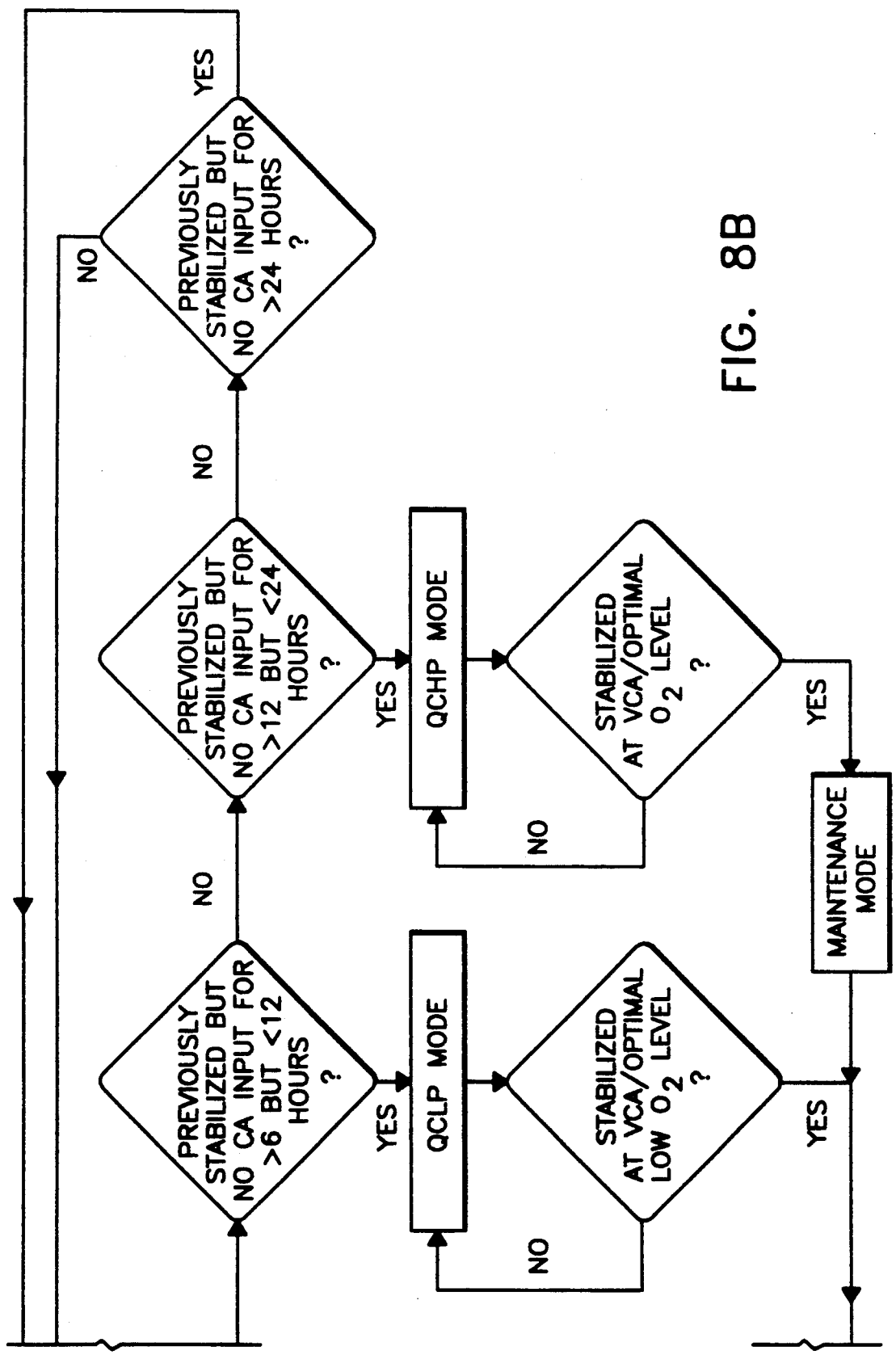

In an example of the present invention for bananas, the initial control program is preferably set to initiate a QCHP mode if the container has not received CA gas input for between about 12 and 24 hours and a controlled input of CA gas might comprise approximately 400 SCF per container (for a standard size banana container). If the container was previously stabilized and disconnected for between about 6 and 12 hours, the QCLP mode is initiated, wherein a lesser amount (e.g., 200 SCF) of gas is provided for each container. Thereafter, the containers will be downgraded to a maintenance mode as shown in FIGS. 8A and 8B. As illustrated in the flow diagram, if the container has not had CA gas input for more than 24 hours following stabilization, the container will be placed in a PHP mode to quickly reestablish the controlled atmosphere therewithin. An exemplary hierarchy for priority of implementation of the control modes within the capacity of a system is as follows:

1st priority-quick cycle high priority (QCHP)
2nd highest priority-pull down high priority (PHP)
3rd highest priority-pull down low priority (PLP)
4th highest priority-quick cycle low priority (QCLP)
5th highest priority-maintenance By monitoring the control mode of particular zones and/or of individual containers, the system (e.g., distribution control unit 25 and/or controller 24) can establish and implement the priority system for supplying the available CA gas from central source 22 in the most optimal manner. Consequently, containers connected to a particular central system 22 will be provided with CA gas within the bounds of the capacity of the system and based upon a hierarchy of priority automatically implemented by the control program in response to atmospheric conditions within the individual containers. Of course, additional control modes can be added, and the priority status of any particular mode can also be changed to adapt the system to a variety of applications and products.

Different products will, of course, have differing rates of respiration and other characteristics which may require different atmospheric conditions. These variables may alter the number and characteristics of the chosen controls modes, and/or modify the priority choices of the hierarchy system. Accordingly, the central source (e.g., 22) may preferably be provided with several optional control programs for use with different applications (e.g. for different products, different containers, different enviromental conditions, etc.). The adaptive characteristics of the present invention enable its virtually unlimited applicability to differing products and shipping/storage conditions. When fully automated, it is contemplated that the system can be effectively automatically adaptive, in an artificial intelligence manner, to react to changing conditions and needs "on the fly".

Figure 9:
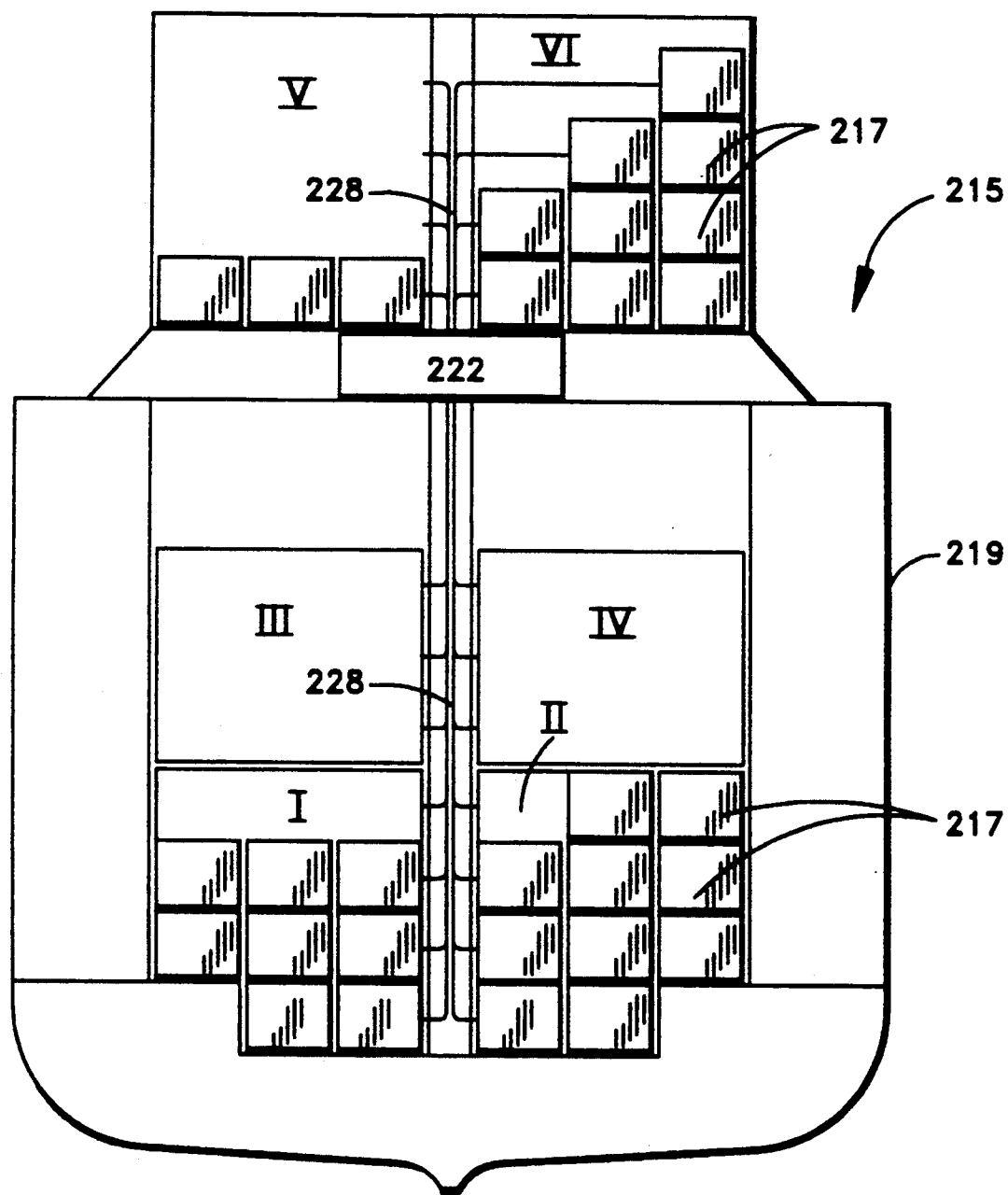
FIG. 9 is a schematic illustration of an embodiment of the controlled atmosphere container system of the present invention as it might be installed in the cargo hold of a ship.

As mentioned above, the present invention can be implemented in a variety of applications, including product storage areas, shipyard container holding areas, cargo holds of ships, airplanes, and the like, and/or distribution or ripening facilities. An example of implementation of a controlled atmosphere container system 215 made in accordance with the present invention is illustrated in FIG. 9, wherein a plurality of perishable product containers 217 are loaded into the cargo hold of a ship 219. As an example, six separate zones (e.g., I-VI) are indicated within the upper and lower cargo hold areas of ship 219, for connection to a central source 222 of CA gas. The central portion of the cargo hold is contemplated as remaining clear for permanent mounting of the controlled atmosphere distribution lines 228 from distribution control units of source 222, which would similarly include flex hose connectors and quick connect coupling assemblies (not shown) as described above with respect to FIG. 1. Application and installation of the container system of the present invention could also be adapted to cargo transport airplanes, train cars, trucks, and the like in a similar manner.

Having shown and described the preferred embodiments of the present invention, further adaptions to the controlled atmosphere container system for perishable products as described herein can be accomplished by appropriate modifications by one of ordinary skill in the art without departing from the scope of the invention. Several of these potential modifications have been mentioned, and others will become apparent to those skilled in the art. Accordingly, the scope of the present invention should be considered in terms of the following claims and is understood not to be limited to the details of structure and function shown and described in the specification and drawings.

We claim:

1. A controlled atmosphere container system for shipping and storing perishable products, wherein said container system comprises a plurality of individual, transportable containers to be connected from time to time with a central source for providing a controlled atmosphere to connected containers, said system further comprising in combination:

a central source of controlled atmosphere to be supplied to at least one container;

each container further comprising a housing defining a storage volume for perishable products which is substantially air tight, at least one door member which can be opened for loading/unloading procedures and sealed for storage and shipping procedures, and an input port on said housing for detachably and selectively providing fluid connection between said storage volume and said central source for providing a controlled atmosphere thereto; and a distribution control unit having means for controlling the distribution of said controlled atmosphere from said central source to at least one connected container in accordance with a predetermined supply control program, said supply control program including subroutines for implementing a plurality of predetermined control modes, including at least two of Pull-Down High Priority Mode, Pull-Down Low Priority Mode, Maintenance Mode, Quick Cycle Low Priority Mode, and Quick Cycle High Priority Mode.

2. The container system of claim 1, wherein said container further comprises a floor within said storage volume and said housing for supporting perishable products, and at least one check valve drain member located adjacent a corresponding drain hole in said floor to enable fluids to be drained from said storage volume, said drain member further comprising a flexible tubular sleeve member to be connected adjacent a drain hole in said floor, and a substantially tubular check valve insert including a valve seat, a valve opening in said seat, and a floatation ball within said insert and normally seated on said seat closing said opening, whereby said insert can be inserted and removed from said sleeve from below said floor.

3. The container system of claim 1, wherein said subroutines of the supply control program include a hierarchy for selectively implementing particular control modes for optimally providing controlled atmosphere from said central source to a plurality of individual containers attached thereto in accordance with the capacity of said central source and the relative atmospheric conditions within said attached containers.

4. The container system of claim 3, wherein a plurality of controlling means are interactively connected with one another to optimally provide controlled atmosphere to the plurality of containers attached to each of said controlling means from a single central source.

5. The container system of claim 3, wherein said predetermined control modes manage optimum initial pull down of atmospheric conditions within containers connected thereto, as well as maintenance of such conditions therewithin, based upon priority of relative atmospheric conditions within all containers connected thereto and the capacity of said source.

6. The container system of claim 1, wherein said relief valve comprises a biasing means for directing said valve from an open or venting position to its normally closed position whenever pressure within said storage volume is below said predetermined maximum.

7. The container system of claim 2, wherein said sleeve comprises top and bottom portions, and an apertured membrane adjacent said bottom portion which permits insertion and removal of said insert, and substantially isolates said insert from ambient conditions in use.

8. The container system of claim 1, further comprising an automatic relief valve apparatus providing selective fluid communication between said storage volume and the ambient atmosphere, said relief valve apparatus comprising a one way valve member having a predetermined mass which is oriented such that gravity helps maintain the relief valve in normally closed position, yet said valve member is displaced to vent the atmosphere within said storage volume when the pressure therewithin reaches a predetermined maximum.

9. The container system of claim 1, wherein said system further comprises means for monitoring the relative atmospheric conditions within the individual containers connected to said system, and said supply control program controls the provision of controlled atmosphere to one or more connected containers based on preset priorities and responsive to said relative atmospheric conditions within said containers.

10. A storage and shipping system for perishable products comprising:

a plurality of independent, transportable containers having a housing and a floor defining a storage volume for perishable products which is substantially air tight, at least one door member which can be opened for loading/unloading procedures and sealed for storage and shipping procedures, an input port on said housing for detachably and selectively providing fluid connection between said storage volume and a source for providing a controlled atmosphere thereto, and an automatic relief valve to ensure that the pressure within said storage volume does not exceed a predetermined maximum;

at least one central station for controlling the internal atmosphere of a plurality of individual containers, said station comprising a source of controlled atmosphere, said source having a predetermined gas output capacity;

means for selectively and detachably connecting said source to at least one individual container; and means for selectively distributing said controlled atmosphere to said at least one individual container in accordance with a predetermined control program having a plurality of preset control modes, including at least two of Pull-Down High Priority Mode, Pull-Down Low Priority Mode, Maintenance Mode, Quick Cycle Low Priority Mode, and Quick Cycle High Priority Mode to optimally establish and maintain a controlled atmosphere within a variable number of said independent containers connected to said central station.

11. The storage and shipping system of claim 10, wherein said container further comprises a floor within said storage volume and said housing for supporting perishable products, and at least one check valve drain member located adjacent a corresponding drain hole in said floor to enable fluids to be drained from said storage volume, said drain member further comprising a flexible tubular sleeve member to be connected adjacent a drain hole in said floor, and a substantially tubular check valve insert including a valve seat, a valve opening in said seat, and a floatation ball within said insert and normally seated on said seat closing said opening, whereby said insert can be inserted and removed from said sleeve from below said floor.

12. The storage and shipping system of claim 10, wherein said means for selectively distributing said controlled atmosphere comprises at least one distribution control unit which distributes controlled atmosphere to a plurality of zones of connected containers in accordance with said predetermined control program.

13. A storage and shipping system for perishable products comprising:

a plurality of independent, transportable containers having a housing and a floor defining a storage volume for perishable products which is substantially air tight, at least one door member which can be opened for loading/unloading procedures and sealed for storage and shipping procedures, an input port on said housing for detachably and selectively providing fluid connection between said storage volume and a source for providing a controlled atmosphere thereto, and an automatic relief valve to ensure that the pressure within said storage volume does not exceed a predetermined maximum;

at least one central station for controlling the internal atmosphere of a plurality of individual containers, said station comprising a source of controlled atmosphere, said source having a predetermined gas output capacity;

means for selectively and detachably connecting said source to at least one individual container; and means for selectively distributing said controlled atmosphere to said at least one individual container in accordance with a predetermined control program to optimally establish and maintain a controlled atmosphere within a variable number of said independent containers connected to said central station, wherein said means for selectively distributing said controlled atmosphere includes a plurality of preset control modes and a hierarchy for selectively implementing particular control modes for optimally providing controlled atmosphere from said source to said plurality of connected containers in accordance with the capacity of said source, said distributing means comprising a program for determining optimal allotment of the controlled atmosphere in accordance with said hierarchy and capacity.

14. A storage and shipping system for perishable products comprising:

a plurality of independent, transportable containers having a housing and a floor defining a storage volume for perishable products which is substantially air tight, at least one door member which can be opened for loading/unloading procedures and sealed for storage and shipping procedures, an input port on said housing for detachably and selectively providing fluid connection between said storage volume and a source for providing a controlled atmosphere thereto, and an automatic relief valve to ensure that the pressure within said storage volume does not exceed a predetermined maximum;

at least one central station for controlling the internal atmosphere of a plurality of individual containers, said station comprising a source of controlled atmosphere, said source having a predetermined gas output capacity;

means for selectively and detachably connecting said source to at least one individual container; and means for selectively distributing said controlled atmosphere to said at least one individual container in accordance with a predetermined control program to optimally establish and maintain a controlled atmosphere within a variable number of said independent containers connected to said central station, wherein said means for selectively distributing said controlled atmosphere comprises at least one distribution control unit which distributes controlled atmosphere to a plurality of zones of connected containers in accordance with said predetermined control program, and said distribution control units are interactively connected with one another to optimally provide controlled atmosphere to the plurality of containers attached to each of said controlling means from a single central source.

15. A storage and shipping system for perishable products comprising:

a plurality of independent, transportable containers having a housing and a floor defining a storage volume for perishable products which is substantially air tight, at least one door member which can be opened for loading/unloading procedures and sealed for storage and shipping procedures, an input port on said housing for detachably and selectively providing fluid connection between said storage volume and a source for providing a controlled atmosphere thereto, and an automatic relief valve to ensure that the pressure within said storage volume does not exceed a predetermined maximum, said relief valve comprising a one way valve member having a predetermined mass which is oriented such that gravity helps to maintain the relief valve in normally closed position, said valve member being displaced to vent the atmosphere within said storage volume when the pressure therewithin exceeds a predetermined maximum, and a biasing means associated with said one way valve member for directing said valve from an open or venting position to its normally closed position whenever pressure within said storage volume is below said predetermined maximum;

at least one central station for controlling the internal atmosphere of a plurality of individual containers, said station comprising a source of controlled atmosphere, said source having a predetermined gas output capacity;

means for selectively and detachably connecting said source to at least one individual container; and means for selectively distributing said controlled atmosphere to said at least one individual container in accordance with a predetermined control program to optimally establish and maintain a controlled atmosphere within a variable number of said independent containers connected to said central station.

16. A storage and shipping system for perishable products comprising:

a plurality of independent, transportable containers having a housing and a floor defining a storage volume for perishable products which is substantially air tight, at least one door member which can be opened for loading/unloading procedures and sealed for storage and shipping procedures, an input port on said housing for detachably and selectively providing fluid connection between said storage volume and a source for providing a controlled atmosphere thereto, and an automatic relief valve to ensure that the pressure within said storage volume does not exceed a predetermined maximum;

at least one central station for controlling the internal atmosphere of a plurality of individual containers, said station comprising a source of controlled atmosphere, said source having a predetermined gas output capacity;

means for selectively and detachably connecting said source to at least one individual container;

means for selectively distributing said controlled atmosphere to said at least one individual container in accordance with a predetermined control program to optimally establish and maintain a controlled atmosphere within a variable number of said independent containers connected to said central station, and at least one check valve drain member located adjacent a corresponding drain hole formed in said floor to enable fluids to be drained from said storage volume, said drain member further comprising a flexible tubular sleeve member to be connected adjacent a drain hole in said floor, and a substantially tubular check valve insert including a valve seat, a valve opening in said seat, and a floatation ball within said insert and normally seated on said seat closing said opening, whereby said insert can be inserted and removed from said sleeve from below said floor.

17. The container system of claim 16, wherein said sleeve comprises top and bottom portions, and an apertured membrane adjacent said bottom portion which permits insertion and removal of said insert, and helps to substantially isolate said insert from ambient conditions in use.

18. A method for the storage and shipping of perishable products in containers having controlled internal atmospheres to maintain optimal freshness and quality of such products, said method comprising the steps of:

providing a container system including a plurality of independent transportable containers having a housing and a floor defining a substantially air tight storage volume for perishable products, at least one door member which can be opened for loading/unloading procedures and sealed for storage and shipping procedures, and an input port on said housing for detachably and selectively providing fluid connection between said storage volume and a source for providing a controlled atmosphere thereto;

providing at least one central station with said system for controlling the internal atmosphere of a plurality of individual containers connected to the system, said station comprising a source of controlled atmosphere gas having a predetermined output capacity, means for selectively and detachably connecting said source to at least one individual container, means for controlling distribution of controlled atmosphere via a plurality of predetermined control modes, and means for selectively distributing said controlled atmosphere gas to individual containers;

loading said at least one individual, transportable container with perishable products;

sealing the loaded individual containers in a substantially air tight manner;

independently connecting said at least one loaded and sealed container to said central station;

establishing a hierarchy for selectively implementing particular control modes for optimally providing controlled atmosphere from said source to a plurality of containers connected to the system in accordance with the capacity of said source;

providing a controlled atmosphere to the storage volume of the connected containers in accordance with a predetermined control mode and said hierarchy to establish a substantially uniform controlled atmosphere among the individual containers; and providing additional controlled atmosphere gas to said containers from time to time in accordance with a different control mode and said hierarchy for augmenting the controlled atmosphere within individual containers in response to monitored internal atmospheres of the containers.

19. The method of claim 18, wherein a plurality of controllers are associated with the central station, each controller connected to a plurality of individual containers making up at least one zone, and wherein said controllers interact with each other to provide an optimal controlled atmosphere within connected containers in a plurality of zones in accordance with said hierarchy and the capacity of said source.

20. The method of claim 18, wherein said controlled atmosphere is provided to connected containers in an orderly manner such that a predetermined first lowered oxygen level atmosphere is substantially uniformly provided to all of the connected containers in accordance with the relative internal atmospheres of the respective containers and the capacity of said source and, thereafter, additional controlled atmosphere gas is provided to said containers under a different control mode to establish a second and optimal low oxygen atmosphere within said containers connected to said system.

21. The method of claim 20, wherein said first lowered oxygen level is accomplished in a pulldown control mode, the second optimal low oxygen atmosphere is accomplished in a quick cycle control mode, and maintenance of said optimal low oxygen atmosphere is accomplished in a maintenance control mode, and wherein said hierarchy prioritizes the pulldown control mode above the quick cycle control mode, and the quick cycle control mode above the maintenance control mode.

* * * * *